H. GEPPERT.
METHOD OF PROTECTING ARTICLES FROM EARTH CURRENTS.
APPLICATION FILED FEB. 24, 1909.
989,596.
Patented Apr. 18, 1911.
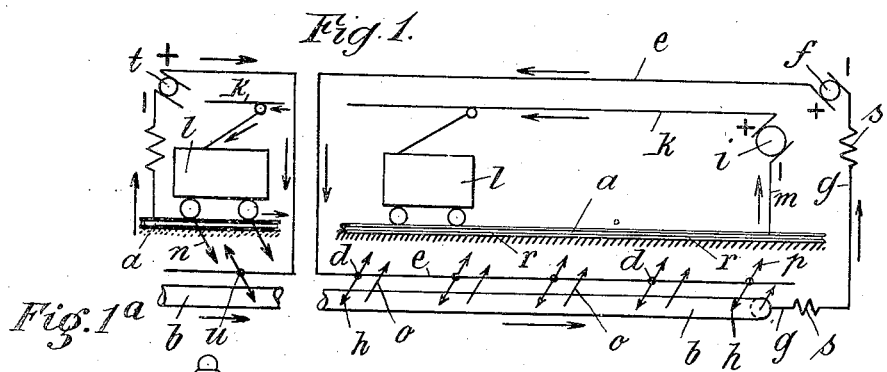
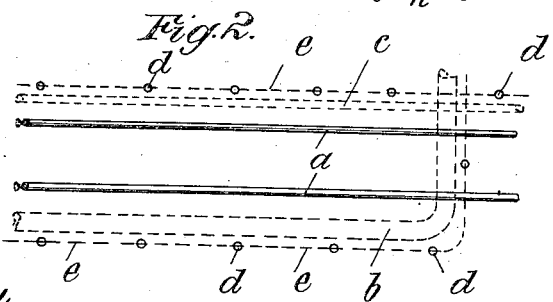
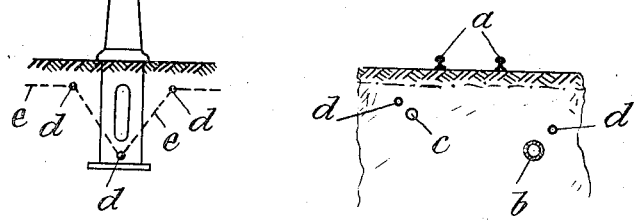
Witnesses:
John Lotka
John A. ...
Inventor
Hermann Geppert
By Briesen & Knauth
Attorneys

UNITED STATES PATENT OFFICE.

HERMANN GEPPERT, OF KARLSRUHE, GERMANY.

METHOD OF PROTECTING ARTICLES FROM EARTH-CURRENTS.

989,596.  Specification of Letters Patent.  Patented Apr. 18, 1911.

Application filed February 24, 1909. Serial No. 479,722.

*To all whom it may concern:*

Be it known that I, HERMANN GEPPERT, engineer, and resident of 67 Kaiserstrasse, Karlsruhe, Grand Duchy of Baden, Germany, have invented new and useful Improvements in the Method for Protecting Articles from Earth-Currents, of which the following is a specification.

Metallic articles, such as gas and water pipes, telephone and telegraph cables, bridge anchors and posts, embedded in the ground, are exposed to destruction by the chemical action of the soil and by the electrolytic action of earth currents (roving or stray currents) which are mainly generated by the working current of electrical tramway and lighting plants. Means are already known by which earth currents of this kind can be rendered more or less harmless by special protective circuits. According to the present invention also, a protective circuit is provided for the same purpose, the same differing, however, in many respects from the known methods both in its mode of application and action.

The article to be protected is connected with the negative pole of any convenient source of electricity (cells, accumulators, dynamos), while at the same time, anodes sunk into the earth in suitable positions, are connected with the positive pole of the same source of electricity.

Figure 1 of the drawing gives a diagrammatic view of the device according to this invention; Fig. 1ª is a similar view of a modification; Fig. 2 is a plan of Fig. 1 and Figs. 3 and 4 are cross sections.

$a$ represents the rail of the tramway or railway track; $b$ is a pipe and $c$ (Figs. 2 and 3) a cable that is exposed to destruction by earth currents, and for which protection against the latter is desired. $d$ represents the anodes that are sunk in the ground for this purpose, and $e$ the electrical conductor conveying the current to the anodes $d$, the conductor being connected up with the positive pole of any convenient source of electricity $f$ (Fig. 1). The negative pole of the source of current $f$ is electrically connected with the pipe $b$, to be protected, by means of a conductor $g$. Hence a current flows from the source $f$ in the direction of the arrows $h$ from the electrodes $d$ and through the ground to the pipe $b$.

It is known that the current escaping into the earth sets up an electrolytic action on the body from which it escapes; whereas the entering current protects the body in which it enters, in consequence of the generation of hydrogen. Hence a protective circuit $f$—$e$—$d$—$h$—$b$—$g$—$f$ is formed, which, though exposing the anodes $d$ to destruction, protects the pipe $b$.

The working current of the tramway passes from the source of current $i$ through the overhead wire $k$, the car $l$ (Fig. 1, dotted lines) the rails $a$ and the conductor $m$ (Fig. 1) back to $i$. A portion of the working current passes from the car $l$ through the rails $a$, in the direction of the arrow $n$ (Fig. 1) through the earth to the pipe $b$. If the source of current $f$ be now switched off, this part of the working current makes it escape (at those parts of the tram or railway installation where the tension in the rails $a$ is correspondingly lower) from the pipe $b$ into the earth flowing in the direction of the arrows $o$, and toward the rails $a$. In consequence of this, the pipe $b$ is subjected to electrolytic corrosion. If, however, the source of current $f$ be switched on, then, as stated above, a current flows from the anodes $d$ in the direction of the arrows $h$ through the earth to the pipe $b$, and, given a sufficiently high tension of the auxiliary current furnished by $f$, the working current is prevented from issuing from the pipe $b$, in the direction marked by the arrows $o$. The working current flows through the conductor $g$, the source of current $f$ and the conductor $e$ to the electrodes $d$, and in the direction of the arrows $p$ through the earth to the rails $a$ and through the conductor $m$ back to the source $i$ of the working current.

The device according to this invention presents the advantages that the rails are not corroded at $n$ or $r$, and that the earth currents generated by the auxiliary circuit are relatively small, owing to the presence of an earth resistance between the anodes $d$ and the rails $a$, while direct connection between the pipe $b$ (or cable $c$) and the rails, the working dynamo or the overhead wire is prevented.

Under certain conditions the earth currents can be still further lessened by the interposition of suitable resistances (*e. g.* the wire resistance $s$ in Fig. 1) and by making the anodes $d$ small or of material of low conductivity.

The arrangement as described is usually provided only in the vicinity of the generating station $i$. However, it may be extended so as to embrace a greater or less amount of trackage as well; the destructive earth currents will then be reduced substantially in proportion to the extent of trackage thus included.

The particulars given in respect of the pipe $b$ apply equally to lead cables $c$ (Figs. 2 and 3). The rails $a$ also may be specially protected in the same way at suitable parts of the track, by a source of current $t$ (Fig. 1; dotted lines) and anodes $u$.

The anodes $d$ and $u$ are embedded in the earth in any way that circumstances may render desirable; or they may also be on the surface of the ground provided they are, in such case, placed in adequate electrical contact with the earth.

The strength of current passing between the anodes $d$, the pipe $b$ and the cable $c$ will naturally be cut down to the smallest practicable figure in order to save expense, and therefore the anodes $d$ should be distributed in the manner best adapted to the needs of each case, and should also be as small as possible, in order to increase their electrical resistance and to allow only a weak current to pass even when the voltage is high.

In order to insure adequate electrical contact between the anodes $d$ and earth, even in dry weather, the anodes $d$ may be surrounded with damp clay, earth saturated with brine, or some equivalent mass. They are preferably made interchangeable or of inert or non-corrosive material (e. g. carbon, nickel, platinum, gold) or coated with same, and may be of any convenient shape.

If the conductor $e$ be in the ground and not insulated it may serve direct as the anode; and in the event of insulated conductors $e$ being sheathed in metal, the sheathing may also be connected up with the negative of the auxiliary source of electricity and thereby protected from destruction.

If the articles to be protected are situated in running water for instance then the anodes will also be submerged in the water.

The device in accordance with this invention may be put to a variety of uses. Thus, for instance, Fig. 4 indicates how it can be used to protect an iron standard from corrosion. Here the anodes are also marked $d$ and the corresponding conductors $e$; and the method of operation is the same as described above.

Now what I claim and desire to secure by Letters Patent is the following:

1. The improvement in the art of preventing electrolytic decomposition of underground pipes by reason of stray currents from electrically operated railway systems, which consists in negatively electrifying said pipes and establishing a line of positive electrification closely adjacent to said pipes, substantially as described.

2. The improvement in the art of preventing electrolytic decomposition of underground pipes by reason of stray currents from electrically operated railway systems, which consists in negatively electrifying said pipes and establishing a line of positive electrification adjacent to and at a substantially uniform distance from said pipes, substantially as described.

3. The improvement in the art of preventing electric decomposition of underground pipes by reason of stray currents from electrically operated railway systems, which consists in connecting the negative pole of an independent circuit to the pipes and the positive pole of said circuit to conductors arranged adjacent to said pipes and then supplying electricity from said independent circuit substantially as described.

4. The improvement in the art of preventing electric decomposition of underground pipes by reason of stray currents from electrically operated railway systems, which consists in creating a region of positive electrification adjacent to said pipes, and then negatively electrifying both said pipes and the rails of the system, thus causing current to flow from said region to both said pipes and to the rails of the system, substantially as and for the purpose described.

5. In combination with the rails of an electrically operated railroad system, said rails being used to carry operating current, a source of electricity, underground pipes, and conductors arranged adjacent to said pipes, said pipes and conductors being respectively joined to the negative and positive sides of said source of electricity, substantially as described.

In testimony, that I claim the foregoing as my invention, I have signed my name in presence of two witnesses, this eleventh day of February, 1909.

HERMANN GEPPERT.

Witnesses:
 Jos. H. LEUTE,
 N. ROMARED.